(12) United States Patent
Obst

(10) Patent No.: US 8,226,037 B2
(45) Date of Patent: Jul. 24, 2012

(54) AIRCRAFT DOOR ASSEMBLY, AND AIRCRAFT FUSELAGE COMPRISING SUCH AN AIRCRAFT DOOR ASSEMBLY

(75) Inventor: Steffen Obst, Harburg (DE)

(73) Assignee: Eurocopter Deutschland GmbH, Donauwoerth (DE)

(*) Notice: Subject to any disclaimer, the term of this patent is extended or adjusted under 35 U.S.C. 154(b) by 918 days.

(21) Appl. No.: 12/158,317

(22) PCT Filed: Dec. 2, 2006

(86) PCT No.: PCT/DE2006/002143
§ 371 (c)(1),
(2), (4) Date: Nov. 18, 2008

(87) PCT Pub. No.: WO2007/076755
PCT Pub. Date: Jul. 12, 2007

(65) Prior Publication Data
US 2009/0072089 A1    Mar. 19, 2009

(30) Foreign Application Priority Data

Dec. 19, 2005    (DE) .................. 10 2005 061 127

(51) Int. Cl.
*B64C 1/14*    (2006.01)
(52) U.S. Cl. .................................... 244/129.5
(58) Field of Classification Search ............... 244/129.3, 244/129.4, 129.5, 118.3, 129.6
See application file for complete search history.

(56) References Cited

U.S. PATENT DOCUMENTS

| 3,647,169 | A | | 3/1972 | Allwright et al. |
| 4,720,065 | A | * | 1/1988 | Hamatani .................. 244/129.5 |
| 5,303,508 | A | * | 4/1994 | Porte ............................... 49/109 |
| 6,568,637 | B2 | * | 5/2003 | Bluem et al. ............... 244/129.5 |

FOREIGN PATENT DOCUMENTS

| DE | 19702084 | 2/1998 |
| DE | 19921326 | 6/2000 |
| WO | 2006/072749 | 7/2006 |

* cited by examiner

*Primary Examiner* — Tien Dinh
*Assistant Examiner* — Richard R Green
(74) *Attorney, Agent, or Firm* — Brooks Kushman P.C.

(57) ABSTRACT

An aircraft door assembly of an aircraft, having a fuselage with a door opening and a door frame, encompassing an aircraft door fittable in the door frame. The door includes a door structure having an outer skin and is liftable from a locked closed position into a unlocked closed position, pivotable into an open position located outside the door frame and outside the fuselage, pivotable from the open position back into the unlocked closed position, and lowerable into the locked closed position such that in the locked closed position, a door gap is present between the door frame and a door edge. The gap defines a space for lifting and lowering the door. The door also includes, on its outer side and on a door edge region, a door gap covering element that extends over the door gap onto the outer side of the aircraft fuselage and covers the door gap, when the door is in the locked closed position. The door gap covering element is fastened onto the door structure and is movable relative to the outer side of the outer skin.

24 Claims, 5 Drawing Sheets

AIRCRAFT DOOR ASSEMBLY, AND AIRCRAFT FUSELAGE COMPRISING SUCH AN AIRCRAFT DOOR ASSEMBLY

CROSS REFERENCE TO PRIOR APPLICATIONS

This application is a U.S. National Phase application under 35 U.S.C. §371 of International Application No. PCT/DE2006/002143, filed on Dec. 2, 2006 and claims benefit to German Patent Application No. DE 10 2005 061 127.3, filed on Dec. 19, 2005. The International Application was published in German on Jul. 12, 2007 as WO 2007/076755.

TECHNICAL FIELD

The present invention relates to an aircraft door assembly of an aircraft that possesses a fuselage having a door opening that is surrounded by a door frame, encompassing an aircraft door, in particular a passenger door, fittable in the door frame. The invention further relates to an aircraft fuselage having an aircraft door assembly of this kind.

BACKGROUND OF THE INVENTION

An aircraft door assembly of an aircraft, such as the assembly depicted in a schematic longitudinal section in FIG. 6, is known. This previously known aircraft door assembly possesses a fuselage 200 having a door opening that is surrounded by a door frame 202, and an aircraft door 204, in particular a passenger door, fittable in the door frame 202. Aircraft door 204 possesses a door structure having an outer skin 206. Aircraft door 204 is liftable from a locked closed position into an unlocked closed position, and from there is pivotable into an open position located outside door frame 202 and outside fuselage 200. The lifting direction is identified in FIG. 6 by an arrow 205. Aircraft door 204 is also pivotable from the open position back into the unlocked closed position, and from there is lowerable back into the locked closed position. In the locked closed position, a door gap 208 (shown with cross-hatching in FIG. 6) is present between door frame 202 and an upper door edge 210. This door edge 208 defines a space for lifting and lowering aircraft door 204. Aircraft door 204 possesses, on its outer side and on a door edge region associated with door frame 202, a door gap covering element 212 that is placed onto outer skin 206 and fixedly joined thereto. With aircraft door 204 in the locked closed position, door gap covering element 212 extends over door gap 208 onto the outer side of fuselage 200, and covers door gap 208.

The upper and the lower edge of door gap covering element 212 rest on the outer side of fuselage 200, thus resulting respectively in an aerodynamically unfavorable sharp edge 214 that also leads to undesirable noise generation in flight.

Door gap covering element 212 is moreover configured in flexurally elastic fashion, so that in the locked closed position it rests tightly and fixedly against the outer skin of fuselage 200. Damage to the surface protection of the outer side of the fuselage thus often occurs upon lifting and lowering of aircraft door 204, since upper edge 206 of door gap covering element 212 rubs in this context against the outer side of fuselage 200.

Also known are aircraft door assemblies that do not comprise a door gap covering element, but in which the door gap is simply filled with a flexible-rubber filler material. This filler material is compressed upon lifting of the door into the unlocked closed position. When the door is lowered back into the locked closed position, the filler material expands again and closes off the door gap. With this approach, however, the transition regions from the filler material to the door frame or door structure exhibit large discontinuities, so that these aircraft door assemblies have less-favorable aerodynamic properties. The filler material is moreover highly stressed during opening and closing of the door, and therefore wears very quickly and must therefore be more frequently replaced.

SUMMARY OF THE INVENTION

An object of the present invention is to provide an aircraft door assembly that to the greatest extent possible possesses improved aerodynamic properties and closes off the door gap reliably and without damage to the surface protection of the outer side of the fuselage. A further intention is to make available an aircraft fuselage having an aircraft door assembly of this kind.

In an embodiment of the present invention, the aircraft door assembly of an aircraft, that possesses a fuselage having a door opening that is surrounded by a door frame, encompasses or comprises an aircraft door, in particular a passenger door, fittable in the door frame, which door possesses a door structure having an outer skin; this aircraft door is liftable or lowerable from a locked closed position into a unlocked closed position ready for opening, and is pivotable from there into an open position located outside the door frame and outside the fuselage; in addition, the aircraft door is pivotable from the open position back into the unlocked closed position, and lowerable or liftable from there into the locked closed position; in the locked closed position, a door gap is present between the door frame and a door edge, which gap defines a space for lifting and lowering the door; the aircraft door possesses, on its outer side and on a door edge region associated with the door frame, a door gap covering element that, in the locked closed position, extends over the door gap onto the outer side of the aircraft fuselage and covers the door gap; the door gap covering element is fastened onto the door structure movably relative to the outer side of the outer skin.

With the aircraft door assembly according to the present invention, the door gap covering element can be moved independently of the door. It is possible as a result to move the door gap covering element away from the door and away from contact against the aircraft fuselage or its door frame even before the door is lifted into the unlocked closed position, and conversely to place the door gap covering element back against the door and the aircraft fuselage or its door frame when the door is already in the locked closed position. This not only eliminates unfavorable friction points with the door gap covering element and thus decreases stress on the surface protection of the fuselage outer side or of the door frame, but also allows the door gap covering element to be integrated flush, and in aerodynamically more favorable fashion, into the outer contour of the door, of the aircraft fuselage, and of the latter's door frame. Disadvantageous sharp edges at the transition region between the door gap covering element and the outer contour of the fuselage and of the door are not present in this context. An advantage is that, the overall aerodynamic properties of the aircraft door assembly are improved, undesirable noise generation is avoided, and the door gap can be closed off reliably and without damage to the surface protection of the outer side of the fuselage.

The door gap covering element can also be moved away from the door and away from contact against the aircraft fuselage or its door frame while the door is already being lifted from the locked closed position into the unlocked closed position, or while the door is being unlocked. The door gap covering element can likewise be placed back against the door and against the aircraft fuselage or its door frame while the door is still being lowered from the unlocked closed position into the locked closed position, or while the door is being locked. To prevent the door gap covering element from colliding with the door frame or fuselage, or damaging the surface protection on the outer side of the fuselage by friction, in the context of these two operations, the respective starting times of the motion of the door gap covering element may be precisely coordinated with the respective door sequence and with the starting and ending times of the lifting, lowering, unlocking and locking operations.

The aircraft fuselage according to the present invention, which is equipped in particular with a pressurized cabin, encompasses an aircraft door assembly according to the embodiments presented below. The aircraft fuselage according to the present invention is preferably configured as a fuselage of a fixed-wing aircraft, in particular of a passenger aircraft. The aircraft fuselage according to the present invention can likewise, however, also be embodied as a fuselage of a rotary-wing aircraft, in particular of a helicopter.

Advantages of the aircraft fuselage according to the present invention are substantially the same as those that have already been explained above in connection with the aircraft door assembly according to the present invention.

Preferred exemplifying embodiments of the invention, with additional configuration details and further advantages, are described and explained in more detail below with reference to the attached drawings.

DETAILED DESCRIPTION

Figure 1:
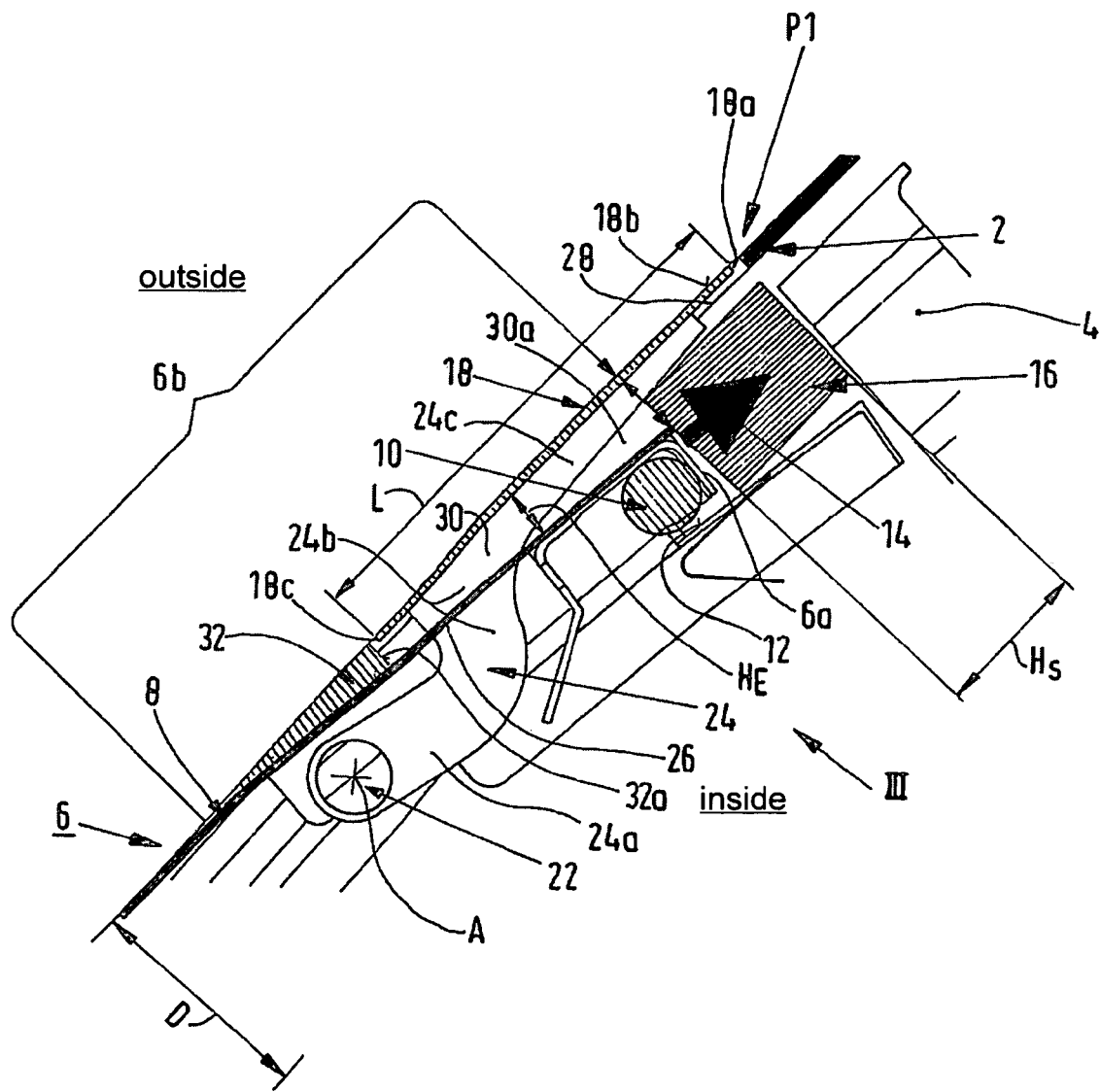
FIG. 1 is a schematic longitudinal sectional view through an aircraft door assembly according to the present invention in accordance with a first embodiment, in a first state.

To avoid repetition, in the description that follows and in the Figures, identical constituents and components are also labeled with identical reference characters unless further differentiation is necessary or useful.

FIG. 1 is a schematic longitudinal sectional view through an aircraft door assembly according to the present invention in accordance with a first embodiment that is in a first state. In the present example, this aircraft door assembly is a component of a fixed-wing aircraft having a fuselage 2 equipped with a pressurized cabin. Fuselage 2 possesses a door opening that opens into the pressurized cabin and is surrounded by a door frame 4. The aircraft door assembly comprises an aircraft door 6 (hereinafter called simply a door 6), configured as a passenger door and as a so-called plug-in door, that can be fitted in or onto door frame 4. Door 6 possesses a door structure having reinforcement elements and having an outer skin 8. Door 6 is further equipped with a peripheral seal 10 with which door 6 is sealable with respect to a contact surface 12 of door frame 4 and thus with respect to the interior of the pressurized cabin.

Door 6 is liftable from a locked closed position, as depicted in FIG. 1 as a first state of door 6, into an unlocked closed position in which door 6 is ready for opening. The lifting direction of door 6 is marked in FIG. 1 with an arrow 14. Door 6 is then pivotable from the unlocked closed position into an open position located outside door frame 4 and outside fuselage 2. Door 6 is furthermore pivotable from the open position back into the unlocked closed position, and from there back into the locked closed position. The door height is configured, with reference to the unobstructed internal height of door frame 4, in such a way that in the locked closed position, a door gap 16 is present between door frame 4 and an upper door edge 6a. Door gap 16, which is identified by cross-hatching in the drawing, defines a space for lifting and lowering door 6.

As is further evident from FIG. 1, door 6 possesses, on its outer side and on a door edge region associated with door frame 4, a movable door gap covering element 18 that, in the locked closed position shown in FIG. 1, extends over door gap 16 onto the outer side of fuselage 2 and of its door frame 4, and covers door gap 16. In this state, door gap covering element 18 is in a first covering element position P1. The width of door gap covering element 18 usefully corresponds at least to the width of door 6 or of its door gap 16. Length L of door gap covering element 18, measured in the height direction of door 6 or of door gap 16, is greater than door gap height Hs. The ratio Hs/L of door gap height Hs to length L of door gap covering element 18 is preferably in a range from 1:10 to 1:1.1, in particular 1:10 to 1:5, in particular 1:6 to 1:3.5. In the present case, the ratio Hs/L is approximately 1:3, and only approximately the upper third of door gap covering element 18 extends over door gap 16.

As is evident from FIG. 1, the movable door gap covering element 18 is embodied in a panel shape. Materials suitable for door gap covering element 18 are, in particular, light alloy panels, for example made from an aluminum alloy, or also composite fiber panels; the latter can possess both a monolithic and a sandwich-like construction. In the longitudinal section of the aircraft door assembly shown in FIG. 1, the panel-shaped door gap covering element 18 is slightly curved. This curvature is adapted to the curvature of door 6 or of fuselage 2 at this location. Because aircraft fuselages, in particular those equipped with pressurized cabins, possess an approximately circular or even oval fuselage cross section or fuselage portions having a correspondingly curved conformation, door 6 and its door gap covering element 18 are consequently also adapted to this conformation.

Figure 2:
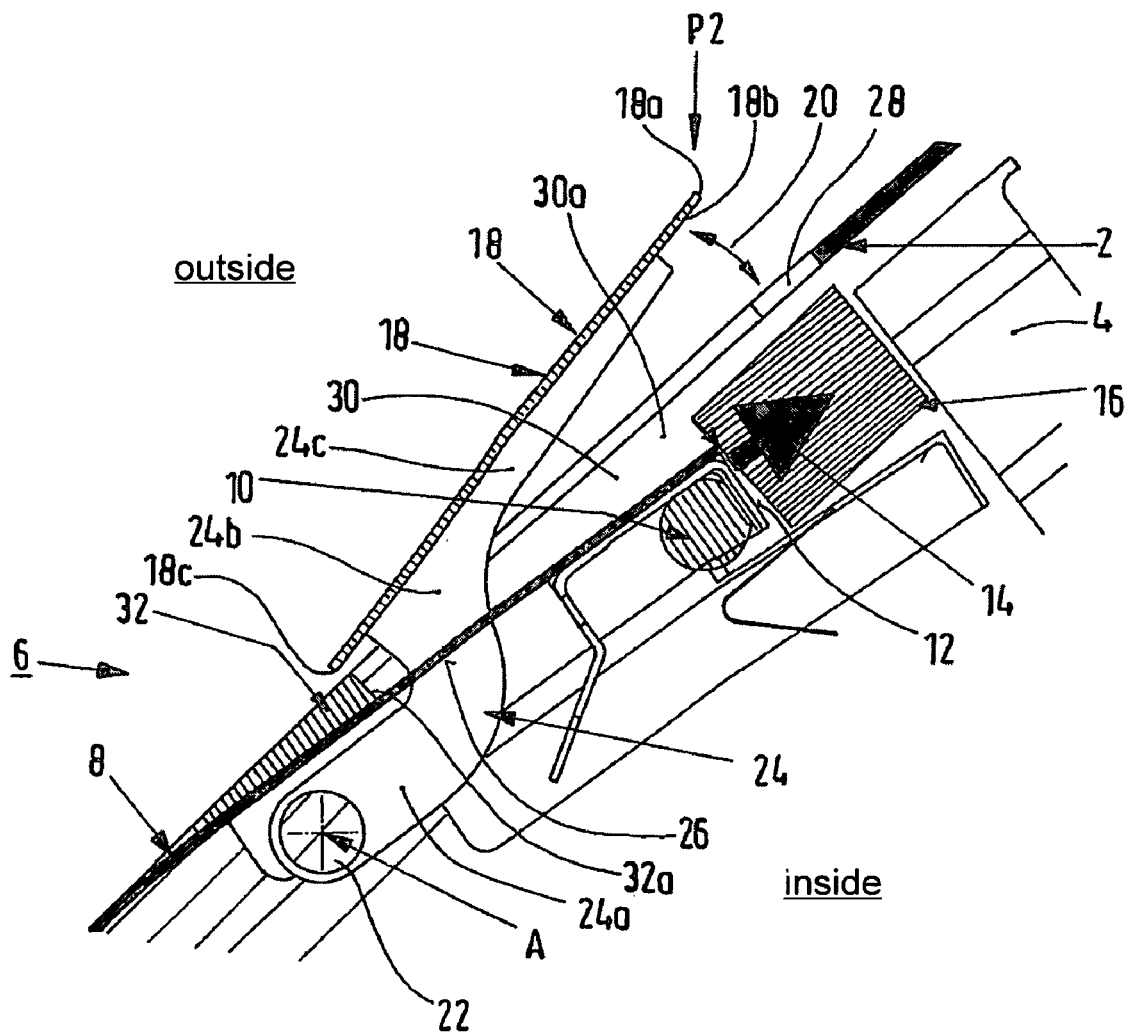
FIG. 2 is a schematic longitudinal sectional view of the aircraft door assembly according to the present invention of FIG. 1, in a second state.

FIG. 2 is a schematic longitudinal sectional view of the aircraft door assembly according to the present invention of FIG. 1 in a second state. In this state, proceeding from the first covering element position P1 sketched in FIG. 1 in which door 6 is in the locked closed position (first state), the movable door gap covering element 18 is movable away from the outer side of outer skin 8 into a second covering element position P2 so that door 6 is then liftable for unlocking. Proceeding from the aforementioned second covering element position P2 and from a state in which door 6 is in the unlocked closed position (second state), the movable door gap covering element 18 is then movable back toward the outer side of outer skin 8 into first covering element position P1. Door 6 is then ready for locking or lowering. This movability of door gap covering element 18 is indicated in FIG. 2 by a double arrow 20.

To allow door gap covering element 18 to be moved in the manner described above, the aircraft door assembly according to the present invention is equipped with an actuation device for moving the movable door gap covering element 18. In the present case, this actuation device is arranged at least partially inside the door structure and is functionally coupled with a locking device for locking and unlocking of door 6. The locking device possesses a locking mechanism, of which a shaft 22 is visible in FIGS. 1 and 2. This actuation device functionally coupled with the locking device moves door gap covering element 18 into second covering element position P1 before or during the lifting or unlocking of door 6. It also moves the movable door gap covering element 18 back into first covering element position P1 after the locking or during the locking of door 6.

As a result of this functional coupling with shaft 22 of the locking mechanism, a separate or additional actuation device that serves exclusively to move door gap covering element 18 is eliminated. Instead, a part of the locking device handles the actuation of door gap covering element 18 and thus performs an advantageous multiple function. Even conventional door designs can thereby be retrofitted, with little complexity, with the system according to the present invention. The functional coupling moreover ensures that the motion of door gap covering element 18 takes place in a manner correspondingly synchronized with the lifting/unlocking or lowering/locking operation of door 6. This prevents upper edge 18a of door gap covering element 18 from bumping against door frame 4 or fuselage 2 upon lifting/unlocking of door 6, since door gap covering element 18 is pivoted in timely fashion before the lifting/unlocking, or in timely fashion even during said operation, into second covering element position P2. Actuation of the door gap covering element 18 can thus be controlled as a function of actuation of the locking device, and can take place in a manner correspondingly synchronized with actuation of the locking device and with lifting/lowering and locking/unlocking of the door.

Depending on the manner in which the actuation device is functionally coupled with the locking device, it is also possible to move door gap covering element 18 into second covering element position P2 during the actual lifting or unlocking of door 6.

The actuation device comprises at least one actuation element, which engages onto the movable door gap covering element 18 and with which door gap covering element 18 is movable. In the present exemplifying embodiment, the at least one actuation element is configured as a pivoting lever 24; and the movable door gap covering element 18 is embodied as a flap-like element pivotable relative to the outer side of outer skin 8 about a pivot axis A, as is clearly visible in FIGS. 1 and 2. Pivot axis A is located in the vicinity of the end of door gap covering element 18 facing away from door gap 16, inside the door structure and in the vicinity of the inner side of outer skin 8. Pivot axis A is constituted in the present case by the rotation axis of shaft 22, which is joined nonrotatably to pivoting lever 24. In this example, therefore, a part of the locking device simultaneously constitutes a part of the actuation device.

As is apparent in particular from FIGS. 1 and 2, pivoting lever 24 is bent in stepped fashion, a first pivoting lever segment 24a extending, in the state shown in FIG. 1, along the inner side of outer skin 8. A second pivoting lever segment 24b adjoining first pivoting lever segment 24a is bent to the left in FIG. 1 toward door gap covering element 18, and passes through outer skin 8 through a passthrough opening 26 provided in outer skin 8. The portion of second pivoting lever segment 24b projecting out of outer skin 8 extends as far as the movable door gap covering element 18. In other words, the actuation element extends from the inner side of door 6, through outer skin 8 by way of passthrough opening 26 therein, to the movable door gap covering element 18.

A third pivoting lever segment 24c adjoining second pivoting lever segment 24b is in turn bent upward and to the right in FIG. 2, and extends substantially along the outer side of outer skin 8 and along the underside of door gap covering element 18 to a point just before the latter's upper edge 18a, and leaves exposed an upper edge region 18b on door gap covering element 18. Pivoting lever 24 shaped in this manner is fixedly joined to door gap covering element 18 in the region of second and third pivoting lever segments 24b, 24c. Pivoting lever 24 simultaneously constitutes a supporting or bracing structure that supports and holds door gap covering element 18. Pivoting lever 24 and door gap covering element 18 either can be implemented as a unit or integrally (integral design), or else can be manufactured by joining two or more separate components (differential design).

It is further evident from FIG. 1 that in the locked closed position of door 6 or in first covering element position P1, the outer side of the movable door gap covering element 18 is flush with the ideal outer contour or reference outer contour of fuselage 2, and with the outer contour or reference outer contour of door 6. To enable this, fuselage 2 or its door frame 4 possesses on its outer side an indentation 28 into which, in the locked closed position of door 6 or in first covering element position P1, upper edge region 18b (associated with door frame 4) of the movable door gap covering element 18 is positionable flush with the reference outer contour of fuselage 2.

In the present example, this indentation 28 is formed by a stepped edge of door frame 4. An intermediate element can be arranged between the underside of edge region 18b and a bottom or a segment of indentation 28 that faces toward said edge region 18b. This intermediate element is to be fastened, for example, to door gap covering element 18 or to indentation 28. It can serve, for example, as a spacer, as a damping element upon placement of door gap covering element 18 against fuselage 2 or indentation 28, or also as a seal for sealing the gap (however small) between upper edge 18a of door gap covering element 18 and fuselage 2 or its door frame 4.

When viewing the aircraft door assembly according to the present invention in the longitudinal section that is shown in FIGS. 1 and 2 and extends in the height direction of door 6, it is evident that the aircraft door assembly possesses a door edge region 6b, associated with door gap 16, in which outer skin 8 is offset, bent, or deformed toward the inner side of the door with respect to the predetermined reference outer contour of door 6 or with respect to a predetermined outer contour of aircraft fuselage 2 in the region of door 6, and the movable door gap covering element 18 is arranged over this inwardly offset door edge region 6b. The result is to create in this door edge region 6b, between the reference outer contour on the one side and the outer side of the inwardly offset outer skin 8 on the other side, a relatively flat installation space 30, substantially wedge-shaped in this case, that widens toward door frame 4 and serves primarily to receive the movable door gap covering element 18. Although the transition from outer skin 8 (initially extending along the reference outer contour) to the inwardly offset door edge region 6b occurs gradually in the present example, an abrupt transition can in principle also be implemented, for example by way of a step in outer skin 8. A gradual transition is, however, generally preferred.

The ratio HE/D between average height HE of installation space 30 measured in the door thickness direction, and thickness D of door 6 in an upper door segment not encompassing door edge region 6b, is preferably in a range from 1:12 to 1:4, in particular 1:10 to 1:6, in particular 1:8 to 1:5, in particular 1:6 to 1:4. In the present exemplifying embodiment, the ratio HE/D is approximately 1:8.5.

Although installation space 30 can in principle be configured so that in the state shown in FIG. 1, it is substantially completely filled up by the movable door gap covering element 18, it is nevertheless preferred that in first covering element position PI, a clearance 30a remain between the inner side of the movable door gap covering element 18 and the outer side of those regions of outer skin 8 located in the inwardly offset door edge region 6b. In the present example, a portion of second pivoting lever segment 24b and of third pivoting lever segment 24c extends in this clearance 30a. In this fashion, pivot lever 24 can perform the above-described supporting or bracing function, and passthrough opening 26 through which pivoting lever 24 extends can be small.

As sketched in FIGS. 1 and 2, there is provided in the lower, tapering region of installation space 30, and between a lower edge region 18c of movable door covering element 18 associated with door 6 and a region of outer skin 8 contiguous with said edge region 18c, a wedge-shaped fairing element 32 that fills up this portion of installation space 30. The predetermined reference outer contour of door 6 at this point is thereby defined. At the same time, in first covering element position P1 shown in FIG. 1, door gap covering element 18 is faired in aerodynamically favorable fashion at its lower edge 18c. Fairing element 32 can also extend, with its upper edge 32a facing toward door gap covering element 18, partially underneath door gap covering element 18. Fairing element 32 can thus function simultaneously as a contact surface and/or sealing element for the lower edge region 18c of door gap covering element 18.

Figure 3:
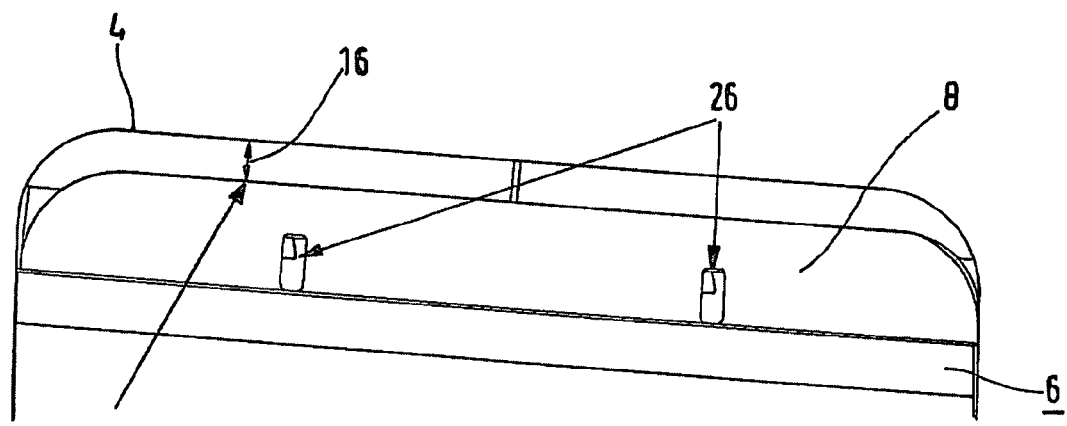
FIG. 3 is a schematic plan view of the aircraft door assembly according to the present invention of FIGS. 1 and 2, looking in a direction corresponding to arrow III in FIG. 1.
Figure 4:
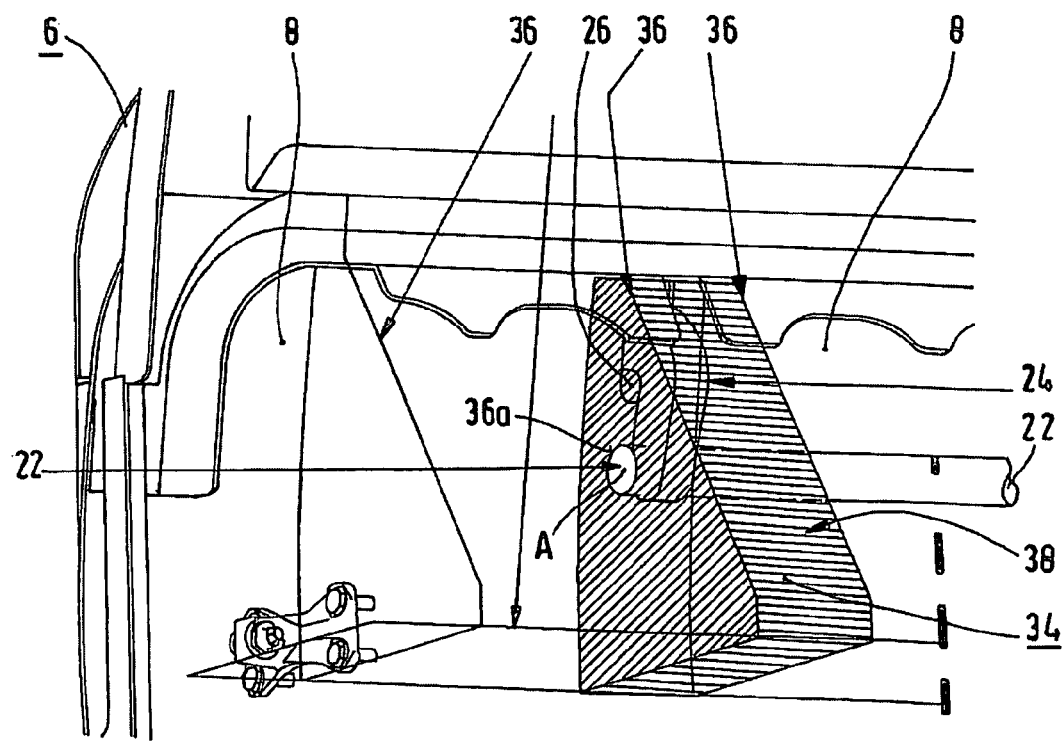
FIG. 4 is a schematic perspective plan view of the aircraft door assembly according to the present invention of FIGS. 1 to 3, looking in a direction corresponding to arrow III in FIG. 1, with further details.

FIG. 3, which is a schematic plant view of the aircraft door assembly according to the present invention of FIGS. 1 and 2 looking in a direction corresponding to arrow III in FIG. 1, illustrates further details of the aircraft door assembly according to the present invention in accordance with the first embodiment. FIG. 3, for example, shows two passthrough openings 26, spaced apart from one another in the width direction of door 6, through each of which can extend a pivoting lever 24 of the actuation device. The actuation device thus preferably possesses at least two pivoting levers 24, spaced apart from one another in the width direction of door 6, that serve simultaneously as a supporting or bracing structure for the movable door gap covering element 18. The two pivoting levers 24 are joined to one another by common shaft 22 as also shown in FIG. 4. A larger number of pivoting levers 24 can also be provided, in particular as a function of the door width.

Because pivoting levers 24, as previously mentioned, each extend through outer skin 8 by way of a passthrough opening 26 therein, the aircraft door assembly possesses a sealing device that seals passthrough opening 26 with respect to the outer side and/or inner side of door 6. It is known that aircraft having pressurized cabins have, in flight and in particular at higher altitudes, an internal cabin pressure that is higher with respect to the external atmosphere. The aforesaid sealing device is therefore provided in order to prevent pressure losses from the cabin and undesirable noise generation at passthrough openings 26. Although in at least one embodiment of the invention the sealing device is mounted directly on passthrough openings 26, a different solution is preferred for the embodiment according to FIGS. 1 to 3.

Reference is made in this context to FIG. 4, which is a schematic perspective plan view of an upper portion of the aircraft door assembly according to the present invention of FIGS. 1 to 3, looking in a direction corresponding to arrow III in FIG. 1.

As is evident from FIG. 4, the actuation device with its pivoting levers 24 is arranged at least in part in a pressure-tight space 34 that is provided inside the door structure and is sealed at least with respect to the inner side of the door and thus also with respect to the interior of the pressurized cabin. In this example, there is provided for each pivoting lever 24 a pressure-tight space 34 in which at least first pivoting lever segment 24a and a part of second pivoting lever segment 24b are located. Pressure-tight space 34 is delimited by outer skin 8, by two adjacent rib segments 36 of the door structure, and by a cover 38 that closes off rib segments 36 toward the inner side of the door. Passthrough opening 26, through which a part of second pivoting lever segment 24b extends outward to door gap covering element 18, opens into said pressure-tight space 34. Shaft 22, which constitutes the common pivot axis A of pivoting lever 24, is rotatably mounted in a respective opening 36a in the two adjacent rib segments 36. The right end as shown in FIG. 4 of shaft 22 protrudes out of pressure-tight space 34, and extends to the adjacent second pivoting lever 24 and into its pressure-tight space 34. Shaft 22 is again rotatably mounted there in the same fashion. The bearing assembly for shaft 22, or for opening 36a provided for the bearing assembly in rib segment 36, is sealed toward the outer side of the pressure-tight space (i.e., toward the inner side of the cabin) with sealing rings. Because, as already mentioned, the respective passthrough opening 26 also opens into pressure-tight space 34, no further sealing device is necessary, in principle, for passthrough opening 26. Such a device can, however, of course be provided optionally.

In an embodiment of the invention, provision is also made to rotatably mount at least one end of shaft 22 in a bearing device arranged entirely inside pressure-tight space 34. This bearing device can be fastened, for example, to the inner side of a rib segment 36 or inside a cup-like indentation or bulge of rib segment 36. An opening to the outer side of pressure-tight space 34 thus no longer exists at this location, and this location consequently need not be separately sealed.

It should be noted that the movable door gap covering element 18 of the aircraft door assembly according to the present invention is surrounded on all sides, in every operating position, by the external atmosphere that exists outside fuselage 2 or outside door 6. Even if fuselage 2 is equipped, as in this example, with a pressurized cabin, the movable door gap covering element 18 is therefore never impinged upon by the internal cabin pressure, but only impinged upon on all sides by the pressure of the surrounding atmosphere. Door gap covering element 18 is therefore only relatively lightly stressed, and consequently can be configured in a very lightweight, but still stable and high-strength, fashion.

Figure 5:
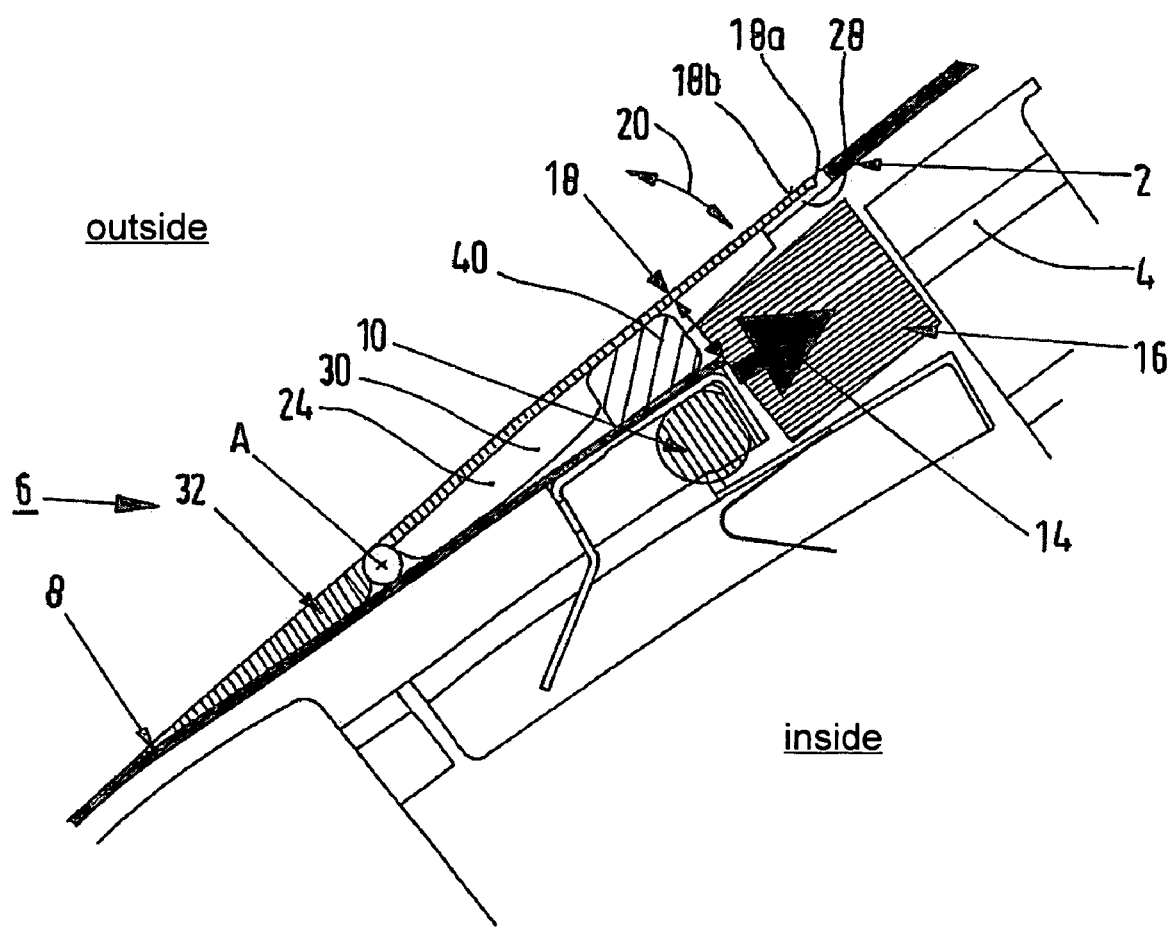
FIG. 5 is a schematic longitudinal sectional view through an aircraft door assembly according to the present invention in accordance with a second embodiment.
Figure 6:
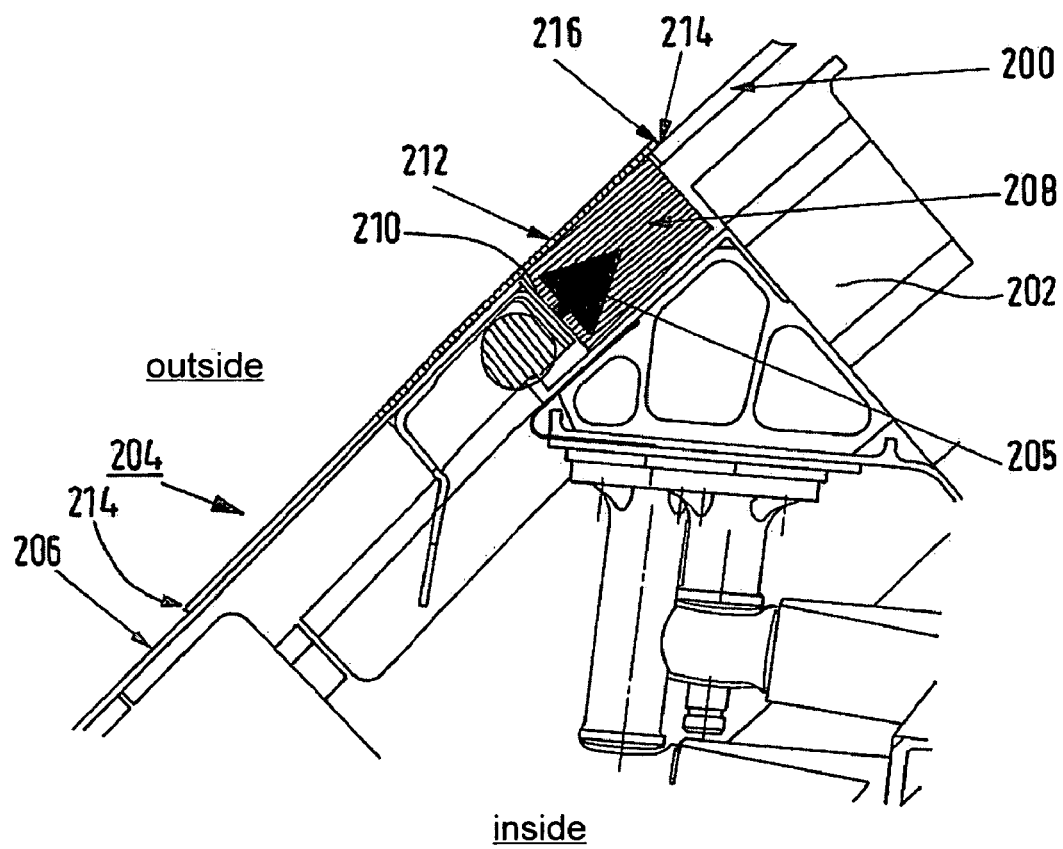
FIG. 6 is a schematic longitudinal sectional view through an aircraft door assembly in accordance with the existing art.

FIG. 5 is a schematic longitudinal sectional view through an aircraft door assembly according to the present invention in accordance with a second embodiment. The construction of door 6 and of the movable door gap covering element 18 corresponds largely to the first embodiment. Unlike the latter, however, it does not possess any pivoting levers that extend through outer skin 8 and are coupled with a shaft of the locking device constituting the pivot axis of the pivoting levers. Instead, in the variant according to FIG. 5 an independent pivot axis A is arranged outside door 6 and above the outer side of outer skin 8. The movable door gap covering element 18 is pivotable about this pivot axis A between the first and the second covering element position.

In addition, in the context of the variant of FIG. 5 the actuation device is arranged in a region (i.e., in installation space 30) between the outer side of outer skin 8 of door 6 and an inner side, facing toward outer skin 8, of the movable door gap covering element 18. The actuation device possesses at least one actuator 40 that engages on door 6 (here on outer skin 8 of door 6) and on door gap covering element 18 and actuator moves door gap covering element 18. Actuator 40 can be, for example, a mechanical, magnetic, electrical, electromechanical, electromagnetic, electrostrictive, in particular piezoelectric, magnetostrictive, hydraulic, or pneumatic positioning device, or a mixed form of the aforesaid types of positioning device. Actuator 40 can, if necessary, additionally be coupled with a linkage device. In at least one embodiment, actuator 40 can also act in non-contact fashion.

The embodiment according to FIG. 5 has the advantage that it requires no passthrough openings in outer skin 8, and corresponding sealing devices, for the actuation device. As a rule, only energy supply lines, control and/or monitoring and/or sensor lines will need to be passed through outer kin 8 to actuator 40 and/or to door gap covering element 18. These passthroughs contain no moving elements, however, so that sealing can be implemented more easily.

As already mentioned, in the embodiment according to FIG. 5 the actuation device or its actuator 40 no longer possesses a mechanical coupling to the locking device or its locking mechanism that correspondingly synchronizes the motion of door gap covering element 18 with the lifting/unlocking or lowering/locking of door 6 and prevents upper edge 18*a* of door gap covering element 18 from bumping against door frame 4 or fuselage 2. For this reason, actuator 40 of the aircraft door assembly of FIG. 5 is coupled with a monitoring device that in turn is connected to the locking device and/or to a suitable sensor that supplies a door control signal representing the respective operating state of door 6 and of its locking device. Based on this door control signal, the monitoring device then supplies a suitable actuator control signal to actuator 40. This actuator control signal ensures that the actuation of actuator 40, and thus of door gap covering element 18, is monitored as a function of the actuation of the locking device, and takes place in a manner correspondingly synchronized with the actuation of the locking device and the lifting or lowering of door 6.

The monitoring device either can be completely integrated into door 6 or can also be located partly or completely, e.g. via an interface, outside door 6, e.g. in or on a door frame region or even in a different suitable position in or on fuselage 2.

Door gap covering element 18 and/or its actuation device can moreover be equipped with a sensor that supplies to the monitoring device a status signal representing the operating state of door gap covering element 18 or of its actuator 40. The monitoring device can in turn be equipped with at least one output lead through which the status signal and/or the door control signal can be supplied to an indicating device or an operating device that is arranged, for example, on door 6, on door frame 4, on a fuselage region, or in the cockpit of the aircraft.

The embodiment according to FIG. 5 is particularly suitable for aircraft door assemblies in which door control, e.g., unlocking, lifting, opening, closing, lowering, locking, and control of the actuation device of the door gap covering element 18, or regulation of said components, is accomplished electrically or electronically.

The invention is not limited to the exemplifying embodiments above. The aircraft door assembly according to the present invention can instead, in the context of the scope of protection of the claims, also assume embodiments other than those described above. In particular, the movable door gap covering element 18 can also possess multiple movable individual door gap covering elements arranged next to one another, which moreover can partly overlap in first covering element position P1. Pivot axis A of the movable door gap covering element 18 can also be positioned so that it is located inside outer skin 8. This is achievable, for example, by the fact that pivot axis A is arranged in corresponding indentations in outer skin 8.

Although the movable door gap covering element 18 was moved only rotationally in the preferred embodiments explained above, it is equally possible in the context of the invention for door gap covering element 18 to be moved only in translation, or even in a combination of a rotational and a translational motion. Correspondingly suitable kinematics must then provided for this. Door gap covering element 18 can also be functionally coupled with a lifting and lowering device of the door, if said lifting and lowering device is not already per se coupled with the locking device of the door.

Reference characters in the Claims, the description, and the drawings serve exclusively for better understanding of the invention, and are not intended to limit the scope of protection.

The invention claimed is:

1. An aircraft door assembly of an aircraft having a fuselage including a door opening, the aircraft door assembly comprising:
   a door frame surrounding the door opening;
   a door including an outer skin defining an outer side of the door,
   the door being liftable from a locked closed position to an unlocked closed position and pivotable from the unlocked closed position to an open position,
   wherein the door is disposed outside the door frame and outside the fuselage in the open position,
   wherein the door is pivotable from the open position to the unlocked closed position and lowerable from the unlocked closed position to the locked closed position;
   a door gap disposed between the door frame and an edge of the door when the door is in the locked closed position; and
   a door gap covering element disposed outboard of the outer side of the door and extending over at least a portion of the outer skin and covering the door gap when the door is in the locked position,
   wherein the door gap covering element is movable relative to the outer side of the door.

2. The aircraft door assembly as recited in claim 1, wherein when the door is in the locked closed position, the door gap covering element is movable from a first covering position to a second covering position so as to enable the door to be liftable and wherein, when the door is in the unlocked closed position, the door gap covering element is movable from the second covering position to the first covering position so as to allow the door to be lockable.

3. The aircraft door assembly as recited in claim 2, further comprising an actuation device configured to move the door gap covering element.

4. The aircraft door assembly as recited in claim 3, wherein the actuation device is disposed between the outer skin and the door gap covering element.

5. The aircraft door assembly as recited in claim 3, wherein at least part of the actuation device is disposed inside the door.

6. The aircraft door assembly as recited in claim 3, further comprising a locking device coupled with the actuation device and configured to perform a locking and an unlocking of the door.

7. The aircraft door assembly as recited in claim 6, wherein the actuation device is configured to move the gap covering element to the second covering position before or during the unlocking of the door and to the first covering position during or after the locking of the door.

8. The aircraft door assembly as recited in claim 6, wherein the locking device includes at least part of the actuation device.

9. The aircraft door assembly as recited in claim 3, wherein the actuation device includes an actuation element engaged with the door gap covering element and configured to move the door gap covering element.

10. The aircraft door assembly as recited in claim 9, wherein the actuation element includes a support structure configured to support the door gap covering element.

11. The aircraft door assembly as recited in claim 10, wherein the support structure includes a brace.

12. The aircraft door assembly as recited in claim 9, wherein the door gap covering element is pivotable relative to the outer side of the door about a pivot axis and wherein the actuation element includes at least one pivoting lever.

13. The aircraft door assembly as recited in claim 12, wherein the door gap covering element includes a flap-like element.

14. The aircraft door assembly as recited in claim 9, wherein the actuation element extends from an inner side of the door through the outer skin through a passthrough opening to the door gap covering element.

15. The aircraft door assembly as recited in claim 14, further comprising a sealing device configured to seal the passthrough opening with respect to at least one of the outer side of the door and the inner side of the door.

16. The aircraft door assembly as recited in claim 3, wherein at least part of the actuation device is disposed in a pressure-tight space provided inside the door and is sealed with respect to an inner side of the door.

17. The aircraft door assembly as recited in claim 3, further comprising a monitoring device couplable with the actuation device and configured to monitor the actuation device.

18. The aircraft door assembly as recited in claim 1, wherein the door gap covering element includes a panel shape.

19. The aircraft door assembly as recited in claim 1, wherein the door gap covering element is movable to a position wherein an outer side of the door gap covering element is flush with an outer contour of the fuselage.

20. The aircraft door assembly as recited in claim 1, wherein the fuselage includes an indentation disposed on an outer side of the fuselage and wherein when the door is in the locked closed position, the gap covering element is movable into the indentation such that an edge region of the gap covering element is flush with an outer contour of the fuselage.

21. The aircraft door assembly as recited in claim 1, wherein a clearance is present between the door gap covering element and the edge of the door.

22. The aircraft door assembly as recited in claim 1, wherein the door gap covering element includes a plurality of door gap covering elements.

23. An aircraft door assembly of an aircraft having a fuselage including a door opening, the aircraft door assembly comprising:
a door frame surrounding the door opening,
a door including an outer skin defining an outer side of the door,
the door being liftable from a locked closed position to an unlocked closed position and pivotable from the unlocked closed position to an open position,
wherein the door is disposed outside the door frame and outside the fuselage in the open position,
wherein the door is pivotable from the open position to the unlocked closed position and lowerable from the unlocked closed position to the locked closed position,
a door gap disposed between the door frame and an edge of the door when the door is in the locked closed position, and
a door gap covering element disposed along the outer side of the door and extending over and covering the door gap when the door is in the locked position,
wherein the door gap covering element is movable relative to the door such that the door gap covering element moves away from the outer side of the door from a first covering position to a second covering element position located outside of the fuselage.

24. An aircraft door assembly of an aircraft having a fuselage including a door opening, the aircraft door assembly comprising:
a door frame surrounding the door opening,
a door including an outer skin along an outer side of the door,
the door being liftable from a locked closed position to an unlocked closed position and pivotable from the unlocked closed position to an open position,
wherein the door is disposed outside the door frame and outside the fuselage in the open position,
wherein the door is pivotable from the open position to the unlocked closed position and lowerable from the unlocked closed position to the locked closed position,
a door gap disposed between the door frame and an edge of the door when the door is in the locked closed position, and
a door gap covering element disposed along the outer side of the door and extending over and covering the door gap when the door is in the locked position,
wherein the door gap covering element is movable outwardly relative to the outer side of the door and moves independently of the door.

* * * * *